April 3, 1962 B. SPEISER Re. 25,153

DUCT DEVICES

Original Filed April 2, 1952

INVENTOR.
BRUNO SPEISER

BY

AWinburn

ATTORNEY.

United States Patent Office

Re. 25,153
Reissued Apr. 3, 1962

25,153
DUCT DEVICES

Bruno Speiser, Syosset, N.Y., assignor, by direct and mesne assignments, to Elgen Manufacturing Corp., Long Island City, N.Y., a corporation of New York Original No. 2,826,221, dated Mar. 11, 1958, Ser. No. 280,094, Apr. 2, 1952. Application for reissue Jan. 15, 1960, Ser. No. 2,793
5 Claims. (Cl. 138—39)

Matter enclosed in heavy brackets [ ] appears in the original patent but forms no part of this reissue specification; matter printed in italics indicates the additions made by reissue.

This invention relates to improvements in ducts and conduits employed for conduction of air and other gases.

An object of the invention is to provide a novel and improved air duct or conduit wherein air is conducted around corners and angle bends with high efficiency.

Another object of the invention is to provide a novel and improved air duct or conduit of the character described wherein improved air guide means are provided at the corners and angle bends to guide the air around such corners without formation of eddy currents and turbulence, the air guide means being characterized especially by improved construction.

A further object of the invention is to provide a novel and improved air guide means for disposition in corners and angle bends of air ducts and conduits, in which a plurality of curved partition walls are supported between upper and lower wall members, novel means being employed to quickly and easily secure the curved partition walls to the upper and lower wall members.

Still another object of the invention is to provide a novel and improved air guide means construction in which there are top and bottom walls having longitudinal grooves formed therein with slots formed across the grooves, and with a number of spaced curved guide plates extending between the top and bottom walls for guiding air smoothly therethrough in air ducts and the like, the top and bottom edges of the curved guide plates extending through the slots so as to project partly into the slots, so that the projecting portions of the guide plates may be bent over to engage securely with the top and bottom walls rendering any other securing means unnecessary.

Still a further object of the invention is to provide a novel and improved air guide construction which is extremely simple in design, inexpensive to manufacture, easy to assemble, and highly effective and efficient in use.

These and other objects and advantages of the invention will become apparent from the following description of a preferred embodiment thereof as illustrated in the accompanying drawings, forming a part hereof, and in which, FIG. 1 is a perspective view showing an air guide device according to the invention, in assembled form;

In connection with the work of manufacturing and installing air ducts, such as are commonly used for heating, ventilating, and air conditioning installations, it has been found that any relatively sharp bends or turns in the ducts will produce eddy currents, turbulence and the like, with a resultant lowering in the volumetric efficiency of air conduction by the duct. To remedy this situation, I provide a novel and improved construction of air guide assembly which fits into the corners and bends of the air ducts, and has a number of curved air guide plates disposed between top and bottom walls, so as to guide the air smoothly around the corner or bend in the duct, the assembly being characterized by the simplicity of its construction.

In order to understand clearly the nature of the invention and the best means for carrying it out reference may now be had to the drawings, in which like numerals denote similar parts throughout the several views.

Figure 6:
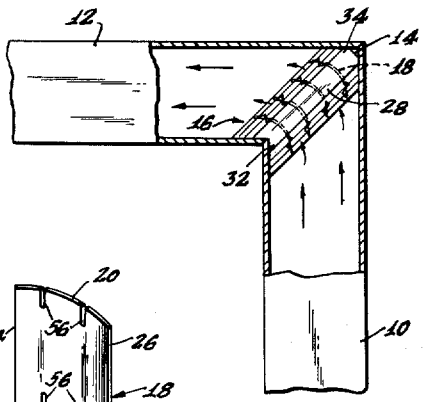
FIG. 6 is a top plan view showing the insertion of my improved air guide device in a corner of an air duct, the view being partly broken out.

As seen best in FIG. 6, there may be a first air duct 10 intersecting with a second air duct 12 at right angles, or some other angle, not shown, so that air may flow in the direction of the arrows from duct 10 to duct 12. In order to avoid eddy currents and turbulence at the corner 14, I provide an air guide device generally shown at 16.

Figure 1:
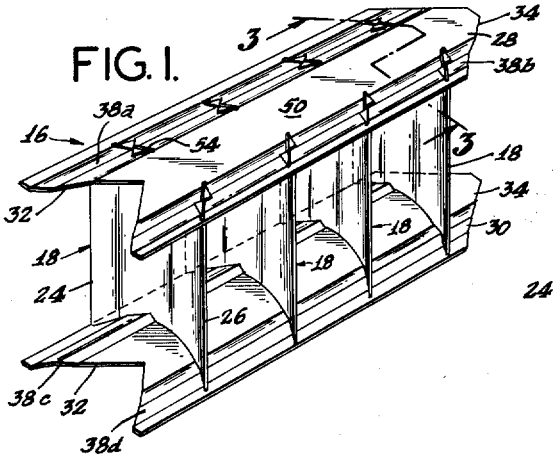
Figure 7:
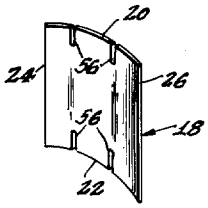
FIG. 7 is a perspective view showing one of the curved air guide plates employed in the devices of FIGURES 1 to 6, apart from the other elements.

Referring now to the other figures of the drawing it is seen that the device 16 includes a number of curved partition walls or guide plates 18, one of which is shown in detail in FIGURE 7. The number of such guide plates 18 to be used will depend upon the width of the air duct, only four such plates being shown in FIGURE 1, though more or less may be employed.

Figure 3:
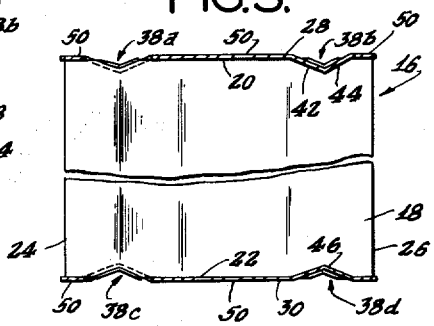
FIG. 3 is an enlarged sectional view taken substantially on plane 3—3 of FIGURE 1.

Such guide plates or blades 18 may be generally rectangular when viewed in elevation, as seen in FIGURE 3, having top and bottom edges 20 and 22, and side edges 24 and 26, the blades being smoothly curved as shown to guide the air around the duct bend or corner. I also provide a pair of plates or walls 28 and 30, which, like the blades 18, may be formed of suitable sheet material, such as metal, or the like. The plates 28 and 30 may each be notched out at one end and cut away at the opposite end, as at 32 and 34, respectively, to fit into the two opposite portions of the corner 14 of the intersection of the air ducts 10 and 12, the portion 32 being notched out and the portion 34 being cut away, as shown.

Figure 4:
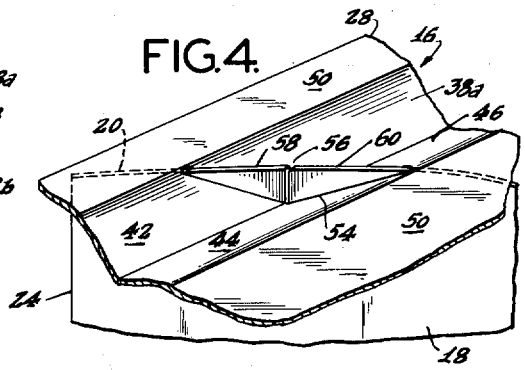
FIG. 4 is an enlarged perspective view of a portion of the device shown in FIGURE 1, except showing the parts prior to the final assembly step of bending over projecting portions of the curved air guide plates in the channel.
Figure 5:
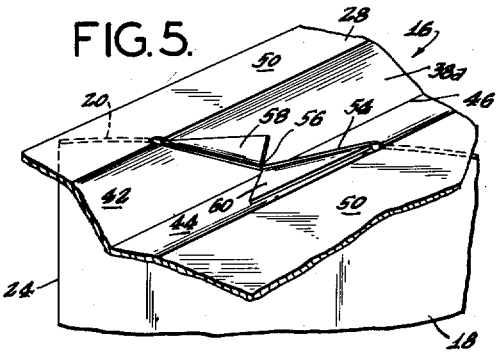
FIG. 5 is a view similar to FIGURE 4, except that it shows the parts after the projecting portions of the curved air guide plates have been bent over.

In the plate 28, I form a pair of longitudinal channels or grooves 38a and 38b by pressing the material of the plate 28 inwardly and in the plate 30 I form a similar pair of longitudinal channels or grooves 38c and 38d. All the grooves 38a, 38b, 38c and 38d are similar to each other, except as to location and orientation. It is noted that the channels 38a and 38b of the plate 28 and the channels 38c and 38d of the plate 30 project in a direction towards each other and are in alignment. As best seen in FIGURES 4 and 5, each of the grooves such as 38a, may comprise converging walls 42 and 44 which intersect on the fold line 46 and terminating at their outer ends in the planar portions 50 of the plates 28 and 30.

Figure 2:
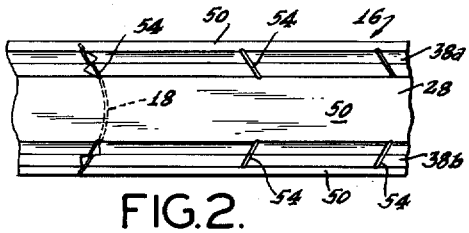
FIG. 2 is a fragmentary top plan view of the device shown in FIGURE 1, but showing only one of the curved air guide plates in assembled position, omitting the air guide plates from two other positions.

Since the top and bottom edges 20 and 22 of the curved guide plates or blades 18 will intersect with the grooves such as 38a, 38b, etc., in the plates 28 and 30, I cut out angular slots 54 through the converging sides 42 and 44 forming the grooves such as 38a, etc. allowing the upper edge 20 and the bottom edge 22 of each of the curved guide blades 18 to extend across and protrude into the grooves of the plates 28 and 30, as clearly shown in FIGURE 4. Vertical cuts may be made in the projecting portions of the blades 18 as shown at 56, to form two tongues 58 and 60 thereat. It is seen that there may be two such slots 54 of each blade 18, in each of the plates 28 and 30, as seen in FIGURE 2, and when the parts are assembled as seen in FIGURE 4, it is a simple matter to bend or pein over one of the tongues 58 in one direction, and the other tongue 60 in the opposite direction, tightly down against the interior surface of the groove, holding the assembly firmly and securely together, the peined over portions lying entirely within the grooves. When thus assembled, the entire air guide unit 16 may be placed in the intersection of the ducts 10 and 12, in the manner of FIGURE 6, and secured thereto by any suitable means, as by screws or the like.

Although I have described my invention in specific terms, it will be understood that various changes may be made in size, shape, materials and arrangement without departing from the spirit and scope of the invention.

I claim:

1. An air guide device comprising a plurality of curved guide blade members arranged in mutually spaced relationship to each other, said guide blade members being rectangular in shape with smooth, straight top and bottom edges, a top plate having a plurality of downwardly extending projections formed therein and a bottom plate having a plurality of upwardly extending projections formed therein, each of said plates being of strip material having parallel longitudinal edges, said top plate and said bottom plate having a plurality of spaced narrow elongated slots cut entirely across said projections, said projections and said guide blade members intersecting in said slots so that portions of the top and bottom edges of said guide blade members project through said slots, said projecting portions being bent over to secure said guide blade members to said plates, said narrow elongated slots being formed in two laterally spaced longitudinal rows, said rows of slots being positioned parallel to one another and to the longitudinal edges of said plates and each of said rows of slots being positioned close to a different one of said longitudinal edges, the slots in each row being parallel to one another and at an angle to the slots in the other row so that if lines were drawn through said slots, these lines would intersect at a point on said plates between said slots, and the slots in each row being in the same lateral plane as the slots in the other row.

2. An air guide device comprising a plurality of curved guide blade members arranged in mutually spaced relationship to each other, said guide blade members being rectangular in shape with smooth, straight top and bottom edges, a top plate having a plurality of downwardly extending projections formed therein and a bottom plate having a plurality of upwardly extending projections formed therein, each of said plates being of strip material having parallel longitudinal edges, said top plate and said bottom plate having a plurality of spaced narrow elongated slots cut entirely across said projections, said projections and said guide blade members intersecting in said slots so that intermediate portions of the top and bottom edges of said guide blade members project through said slots, said projecting portions being secured to said plates at the surface of said plates remote from said blades, said narrow elongated slots being formed in two laterally spaced longitudinal rows, said rows of slots being positioned parallel to one another and to the longitudinal edges of said plates and each of said rows of slots being positioned close to a different one of said longitudinal edges, the slots in each row being parallel to one another and at an angle to the slots in the other row so that if lines were drawn through said slots, these lines would intersect at a point laterally between said slots, and the slots in each row being in the same lateral plane as the slots in the other row.

3. An air guide device comprising a plurality of curved guide blade members arranged in mutually spaced relationship to each other, said guide blade members being rectangular in shape with smooth, straight top and bottom edges, a top plate having a plurality of downwardly extending projections formed therein and a bottom plate having a plurality of upwardly extending projections formed therein, each of said plates being of strip material having parallel longitudinal edges, said top plate and said bottom plate having a plurality of spaced narrow elongated slots cut entirely across said projections, said projections and said guide blade members intersecting in said slots so that portions of the top and bottom edges of said guide blade members project through said slots, said projecting portions being bent over to secure said guide blade members to said plates, said narrow elongated slots being formed in two laterally spaced longitudinal rows, said rows of slots being positioned parallel to one another and to the longitudinal edges of said plates and each of said rows of slots being positioned close to a different one of said longitudinal edges, the slots in each row being parallel to one another and at an angle to the slots in the other row so that if lines were drawn through said slots, these lines would intersect at a point laterally between said slots.

4. An air guide device comprising a plurality of curved guide blade members arranged in mutually spaced relationship to each other, said guide blade members being rectangular in shape with smooth, straight top and bottom edges, a top plate having a plurality of downwardly extending projections formed therein and a bottom plate having a plurality of upwardly extending projections formed therein, each of said plates being of strip material having parallel longitudinal edges, said top plate and said bottom plate having a plurality of spaced narrow elongated slots cut entirely across said projections, said projections and said guide blade members intersecting in said slots so that portions of the top and bottom edges of said guide blade members project through said slots, said guide blade members being secured to said plates by having the portion of said blades which projects through a slot in a projection bent over, said narrow elongated slots being formed in laterally spaced longitudinal rows comprising a first row of slots positioned close to one of said longitudinal edges substantially parallel therewith and a second row of slots positioned close to the other of said longitudinal edges substantially parallel therewith, said first and second rows of slots being positioned substantially parallel to one another, the slots in each row being parallel to one another and at an angle to the slots in the other row so that if lines were drawn through said slots, these lines would intersect at a point laterally between said slots.

5. *A vane runner comprising: an elongated flat strip of sheet metal having parallel longitudinal edges and being capable of receiving and securely retaining mutually spaced guide blade members and thereby constitute the top or bottom plates of an air guide device; said strip having a plurality of projections formed therein extending away from the main plane of said strip on one side thereof; said strip having a plurality of narrow elongated spaced openings extending entirely across said projections so that the ends of said slots lie on said main plane of said strip and being formed therein so that all residual metal is removed entirely across said projections whereby said projections cannot impede the insertion of portions of the top or bottom edges of guide blade members, between the side edges of said blade members, through the entire length of said openings, thereby permitting said portions of the guide blade members to project entirely across the projections of the strip so that said projecting portions of the blades may be readily secured to said strip; said openings being arranged in two laterally spaced longitudinal rows, which rows are parallel to each other and to the longitudinal edges of said strip; each of said rows being positioned close to a different one of said longitudinal edges; the openings in each row being parallel to each other and at an angle to the openings in the other row so that if lines were drawn through said openings, these lines would intersect at a point on said strip between said openings; and the openings in each row be-*

*ing in the same lateral plane as the openings in the other row.*

References Cited in the file of this patent or the original patent

UNITED STATES PATENTS

| | | |
|---|---|---|
| 1,996,596 | Smith | Apr. 2, 1935 |
| 2,216,046 | Peck | Sept. 24, 1940 |
| 2,292,246 | Steffens | Aug. 4, 1942 |

| | | |
|---|---|---|
| 2,302,095 | Bartch | Nov. 17, 1942 |
| 2,345,918 | Dahlstrand | Apr. 4, 1944 |
| 2,396,826 | Callan | Mar. 19, 1946 |
| 2,861,597 | Gracer | Nov. 25, 1958 |

OTHER REFERENCES

"Tuttle & Bailey," Ducturns brochure placed in the record by applicant. Page 43 is pertinent. (Copy in the record of this case.)